United States Patent [19]

Inoue et al.

[11] Patent Number: 4,882,497

[45] Date of Patent: Nov. 21, 1989

[54] METHOD AND APPARATUS OF MEASURING OUTER DIAMETER AND STRUCTURE OF OPTICAL FIBER

[75] Inventors: Akira Inoue; Yasuji Hattori, both of Kanagawa, Japan

[73] Assignee: Sumitomo Electric Industries, Ltd., Osaka, Japan

[21] Appl. No.: 85,598

[22] Filed: Aug. 14, 1987

[30] Foreign Application Priority Data

| | | |
|---|---|---|
| Aug. 15, 1986 [JP] | Japan | 61-191534 |
| Jan. 28, 1987 [JP] | Japan | 62-17506 |
| Mar. 3, 1987 [JP] | Japan | 62-48519 |
| May 12, 1987 [JP] | Japan | 62-115333 |
| May 14, 1987 [JP] | Japan | 62-117488 |

[51] Int. Cl.[4] ............................................. G01N 21/86
[52] U.S. Cl. ............................... 250/560; 356/73.1; 356/384
[58] Field of Search ............... 356/73.1, , 384, 387; 250/227, 560, 562; 350/96.15, 96.21; 358/106, 107

[56] References Cited

U.S. PATENT DOCUMENTS

| | | | |
|---|---|---|---|
| 4,024,723 | 8/1977 | Presby | 356/73.1 |
| 4,027,977 | 6/1977 | Frazee, Jr. et al. | 356/73.1 |
| 4,067,651 | 1/1978 | Watkins | 356/73.1 |
| 4,168,907 | 9/1979 | Presby | 356/73.1 |
| 4,390,897 | 6/1983 | Smithgall, Sr. | 356/73.1 |
| 4,441,811 | 4/1984 | Melezoglu et al. | 356/73.1 |
| 4,565,593 | 1/1986 | Marr | 356/73.1 |
| 4,638,168 | 1/1987 | Marino et al. | 356/73.1 |
| 4,726,677 | 2/1988 | Glantschnig et al. | 356/73.1 |

FOREIGN PATENT DOCUMENTS 0061703 4/1985 Japan .................................. 356/73.1

OTHER PUBLICATIONS

Smithgall et al., "Drawing Lightguide Fiber", *Western Electric Engineer*, 1980, 48–61.

Ito et al., "Automatic Measurements of Fiber Parameters; Dimensional Nonuniformities and Refractive Index Profiles", *Review of Electrical Communication Laboratories*, vol. 26, No. 3–4, 3/78, pp. 518–525.

Millar, "A Measurement Technique for Optical Fiber Break Angles", *Optical and Quantum Electronics*, 13, No. 2, 3/81, pp. 125–131.

*Primary Examiner*—David C. Nelms
*Assistant Examiner*—Michael Messinger
*Attorney, Agent, or Firm*—Sughrue, Mion, Zinn, Macpeak & Seas

[57] ABSTRACT

A method of and apparatus for examining the structure of an optical fiber such as eccentricity, clad and core diameters, and nonroundness of clad. The structure of the optical fiber can be accurately determined by irradiating the side wall of the optical fiber with a light such as a white light, a monochromatic light or the like in the direction perpendicular to the axis of the optical fiber, detecting an image of the light transmitted through the optical fiber and/or diffraction fringes formed by lights diffracted by the outer edge of the optical fiber to obtain a luminance distribution of the light traversing the optical fiber, and calculating the luminance distribution to thereby obtain accurate structural parameters of the optical fiber.

16 Claims, 12 Drawing Sheets

A: ECCENTRICITY = 1.05 (μm)
θ: DIRECTING ANGLE OF ECCENTRICITY
= 261.3 (deg.)

LUMINANCE DISTRIBUTION

METHOD AND APPARATUS OF MEASURING OUTER DIAMETER AND STRUCTURE OF OPTICAL FIBER

BACKGROUND OF THE INVENTION

1. Field of the Invention

The present invention relates to a method of and an apparatus for measuring the outer diameter and the structure of an optical fiber, and more particularly to a method and an apparatus of measuring the outer diameter and structure of an optical fiber without cutting the optical fiber being examined.

2. Prior Art

Conventionally, there has been employed a method of and apparatus for measuring the outer diameter and the internal structure of an optical fiber by cutting the optical fiber being examined and by observing the cross section thereof through a microscope or television camera.

FIG. 1 shows a conventional arrangement for measuring the outer diameter and the internal structure of an optical fiber by means of a microscope, wherein light from a light source 1 is first converged by an injection lens 2 and caused to be incident on an end of an optical fiber 3.

The light from the light source 1 thus converged is propagated through the core of the optical fiber 3. However, the light in a clad of the optical fiber is attenuated during the propagation thereof through the clad because it is radiated from and absorbed by the clad. As a result, a light emitted from an exit edge 3a to be observed originates in only the light propagating through the core, and therefore is used as an illuminating light for the core.

On the other hand, as a light from a light source 10a is incident on the exit edge 3a being observed using a half mirror 9a and is reflected from the clad of the exit edge 3a, it is used as an illuminating light for the clad.

In the rear of the exit edge (edge being observed) 3a, a pickup tube 4 is located so that the edge 3a of the optical fiber can be observed with a lens 8a. The pickup tube 4 is connected to a TV monitor 5a, which is capable of magnifying and displaying an image (light-intensity distribution) of the edge 3a being observed. The luminance distribution on a line A-A' of the monitor TV is as shown in FIG. 2.

The conventional method and apparatus as described above has the following disadvantages.

In the first place, an optical fiber being examined is cut and the cross section thereof is used to observe its structural parameters under the conventional cutting method and accordingly the optical fiber being examined is infallibly damaged;

Secondly, because only the section of an optical fiber can be observed at the cross section thereof through the conventional method, it is impossible to measure the structural parameters continuously along the optical axis of the optical fiber. For the above reason, changes in the structural parameters produced locally in part of the optical fiber are hardly intended for measurements, whereby the total length of the optical fiber cannot be measured accurately;

Thirdly, although a high level of technique is required for the cutting operation, scratches and breakages produced during the cutting operation of an optical fiber allow the inclination of the cross section thereof, which results in the reduction of measurement accuracy. Consequently, the structural parameters are hardly measured accurately;

Fourthly, the section of the optical fiber thus inclined wears a tilt angle relative to the optical axis thereof and, in this case, the difference in observing magnification between the upper and lower portions (or left- and right-hand sides) of the monitor TV 5 makes difficult the calibration of absolute values; and Fifthly, as shown in FIG. 2, (i) and (iv) portions in the light-intensity distribution at the edge of the optical fiber are not completely in step form due to the characteristics of the pickup tube and tilting to some extent. Consequently, measurement must be made by presetting the threshold level to recognize (i), (iv). However, since the (i) and (iv) portions in the light-intensity distribution are dependent on the characteristics ($\gamma$-characteristic, etc.) of the element for use and an illuminating light, it is hardly possible to accurately measure the outer diameter and internal structure of the optical fiber.

SUMMARY OF THE INVENTION

In order to solve the aforesaid problems inherent in the prior art and provide a simple method and apparatus for accurately measuring the structural parameters of an optical fiber, an object of the present invention is to provide a method of optically measuring the structure of an optical fiber by detecting transmitted light through the optical fibers. The method includes the steps of arranging a light source and a pickup system, which includes a pickup lens and a television camera and is connected to an image processing unit, in such a manner that an optical axis connecting the light source to the pickup system is perpendicular to the longitudinal direction of an optical fiber being examined and passes through the center of the optical fiber; revolving the optical fiber around the axis thereof or revolving the light source and the pickup system in such a manner that the optical axis connecting the light source to the pickup system passes through a measuring point on said optical fiber and is perpendicular to the axis of the optical fiber; identifying the relative position of the outer clad edge of the optical fiber and that of a cladding-core boundary at angles of at least two revolutions in the revolving operation; correcting the lens effect on the luminance distribution in an observing plane on the basis of position data of the observing plane and obtaining the true position of the core-cladding boundary at the angle concerned whereby true eccentricity, and cladding and core diameters of the optical fiber are obtained at more than one measured angle; fitting a sine wave function to the eccentricity; and adding an averaging process to the cladding and core diameters, so that the eccentricity, cladding and core diameters and the nonroundness of the cladding defining the structural parameters of the optical fiber are obtained.

Another object of the present invention is to provide a method of optically measuring the outer diameter of an optical fiber by detecting diffracted lights from the outer edge of the optical fiber, the method comprising the steps of paralleling the flux of monochromatic light and irradiating to the side of the optical fiber the monochromatic light in the direction perpendicular to the optical axis of the optical fiber; magnifying and projecting an image obtained by irradiating the monochromatic light; measuring the luminance distribution of the image thus magnified and projected; and calculating the distance between diffraction fringes appearing in a place corresponding to the outer edge of the optical fiber to obtain the outer diameter of the optical fiber and precisely connect optical fibers.

Other object of the present invention is to provide an apparatus for optically examining the structure of an optical fiber comprising a light source for irradiating the side wall of the optical fiber with an observing light and a pickup system for detecting the observing light traversing the optical fiber; and an optical fiber mounting member for mounting the optical fiber thereon, one of the optical fiber mounting member and the optical measuring means being rotatable relatively to the other while the axis of the optical fiber and the optical axis of the optical measuring means are set to be perpendicular to each other.

DETAILED DESCRIPTION OF THE INVENTION

The invention will be described hereinafter in more detail with reference to the accompanying drawings.

Figure 1:
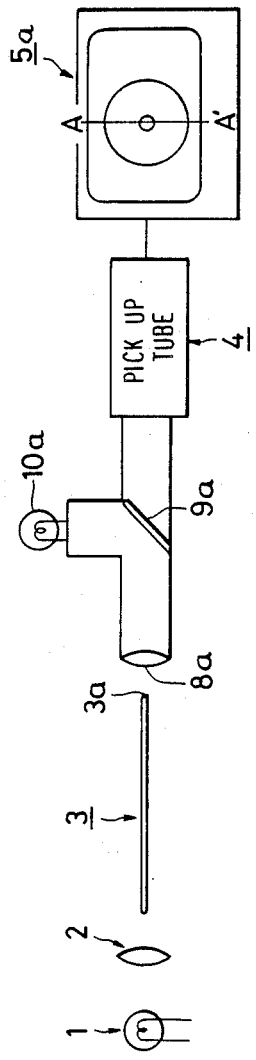
FIG. 1 is a block diagram for a microscope of a conventional instrument for measuring the outer diameter and the internal structure of an optical fiber.
Figure 2:
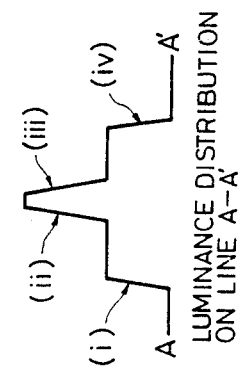
FIG. 2 shows a luminance distribution of a monitored image obtained by the microscope as shown in FIG. 1.
Figure 3:
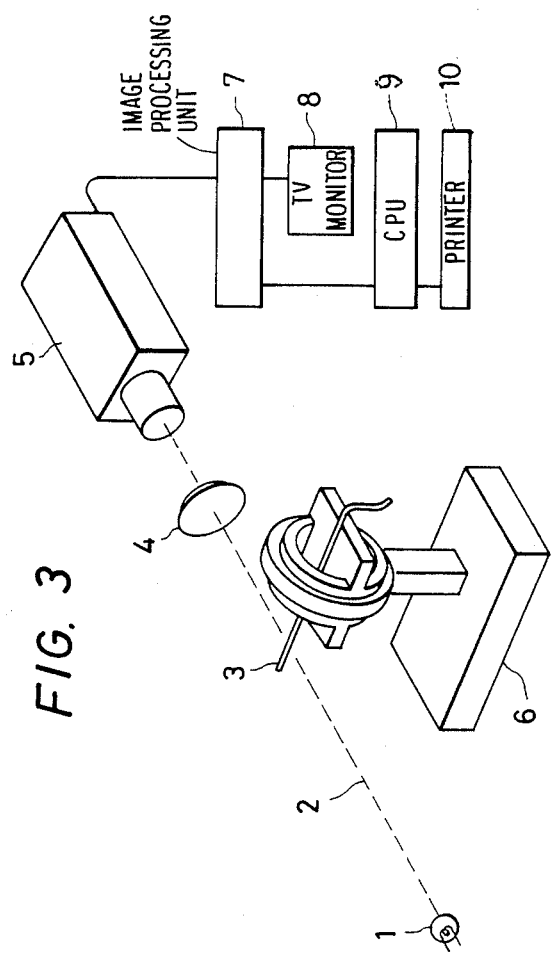
FIG. 3 is a block diagram of an apparatus for examining the structure of an optical fiber through the method of examining the structure thereof according to this invention.

FIG. 3 is a block diagram of an apparatus for examining the structure of an optical fiber using the method according to the present invention. There is shown in FIG. 3 an arrangement of a light source 1; an optical fiber 3 being examined; a pick up lens 4; a television camera 5 (TV camera); a fiber setting stage 6 with a mechanism for rotating the optical fiber 3 around its axis; image processing unit 7; a TV monitor 8; a host CPU 9; and a printer 10. An optical axis 2 connecting the light source 1, the optical fiber 3, the pickup lens 4 and the TV camera 5 are arranged in a position perpendicular to the axis of the optical fiber 3.

Figure 4:
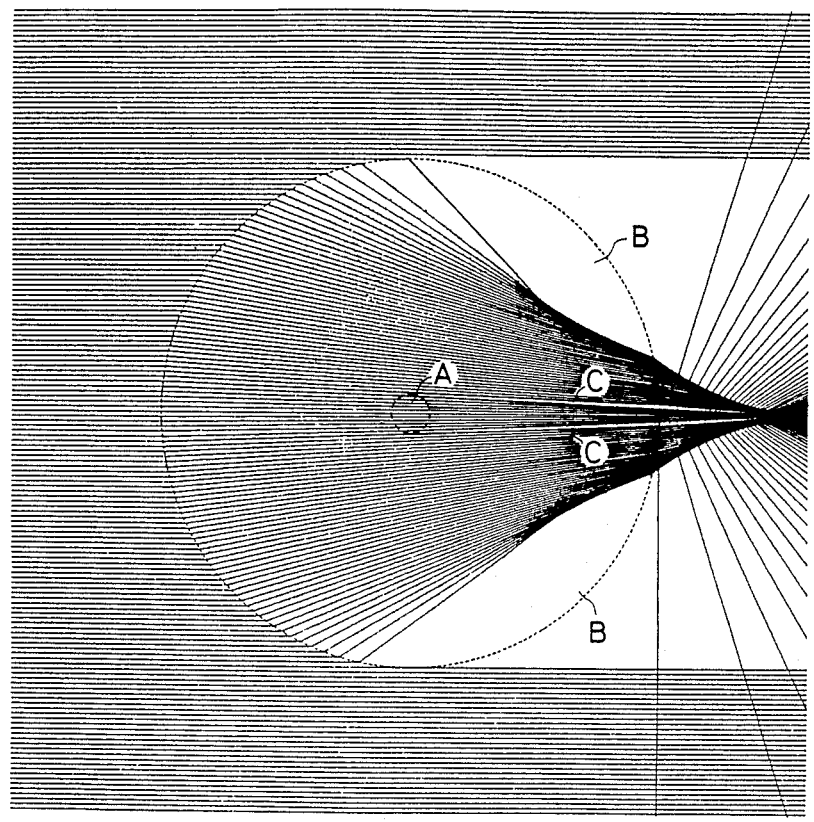
FIG. 4 is a cross-sectional view of an optical fiber to show the advance of light traversing the optical fiber.

FIG. 4 is a cross-sectional view of an optical fiber to show how light traversing the optical fiber advances when the light is incident on a side wall of the optical fiber. The light incident on the side of the optical fiber is refracted by a clad and passed through the clad. A part of the light propagating in the clad is refracted by a core having a higher refractive index than the clad and passed through the core. This difference in the refractive indices of the clad and core causes a lens effect, as described later.

The light thus passed through the clad and the core is monitored by the TV camera.

In FIG. 4, portions designated by (B) and (C) are shadow regions in the clad and the core respectively where the beam of light is not passed.

Figure 5:
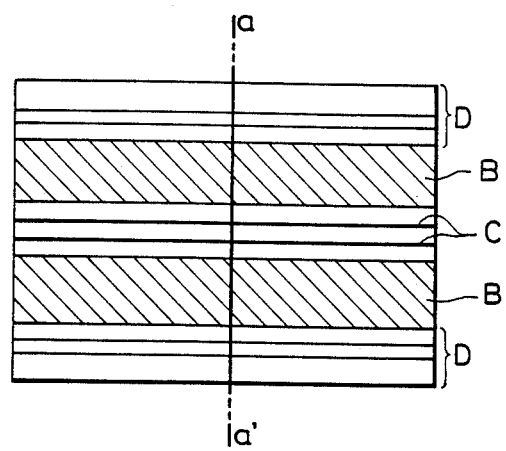
FIG. 5 shows a monitored image of the light traversing the optical fiber as shown in FIG. 4 on a TV camera.

FIG. 5 shows a monitored image of the light traversing the optical fiber on the TV camera.

If a substantially monochromatic light is employed as an incident light on the optical fiber, the light is diffracted by the outer edge of the optical fiber to form diffraction fringes in a position of the luminance distribution corresponding to the outer edge of the optical fiber. The diffraction fringes thus formed are designated by (D) as shown in FIG. 5. The accurate outer diameter of an optical fiber can be obtained by calculating the distance between diffraction fringes.

Apparent structural parameters such as the clad and core diameters and the eccentricity when the optical fiber is viewed from a given angle are obtainable by processing data concerning the luminance distribution of a monitored image as shown in FIG. 5.

Figure 6:
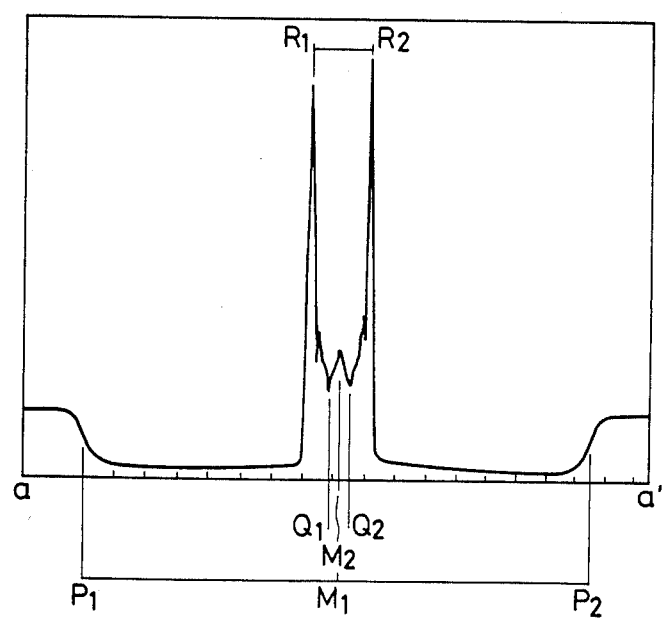
FIG. 6 shows a luminance distribution on a straight line a-a' of the monitored image as shown in FIG. 5 in a case where a white light is used as an incident light.

When white light is used as an incident light, diffraction fringes are not formed and therefore do not show up on the TV camera. FIG. 6 shows a luminance distribution on a straight line a-a' of a monitored image as shown in FIG. 5 when white light is used. In FIG. 6, positions $P_1$, $P_2$ of the outer clad edge are obtained using a fixed slice level and the clad center position $M_1$ is obtained as the mid-point between $P_1$ and $P_2$. Positions $Q_1$, $Q_2$ on the core-clad boundary and the core center position $M_2$ are obtained by processing the luminance data between $R_1$, $R_2$ of the luminance distribution. In this case, eccentricity is defined by the difference between $M_1$ and $M_2$. Moreover, as the positions $Q_1$, $Q_2$ on the core-clad boundary and the core center position $M_2$ change with the position of an observing plane, i.e., the relative position of the focusing position (plane) of the pickup system to the optical fiber due to the lens effect on data of the observing plane of the optical fiber, it is necessary to correct the lens effect as described above.

Figure 7:
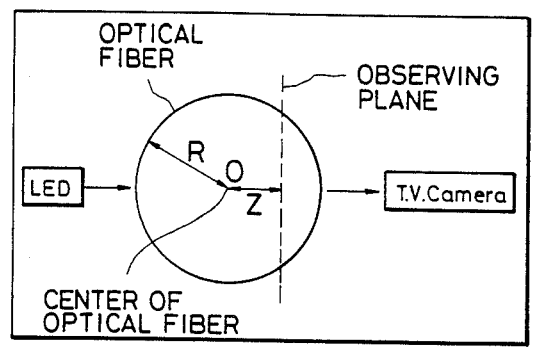
FIG. 7 shows a schematic diagram for explaining the lens effect.

FIG. 7 shows a schematic diagram for explaining the lens effect.

In FIG. 7, the letters 0, R and Z represent the center of an optical fiber, (a clad), a radius of the optical fiber and a distance between the center of the optical fiber and an observing plane, respectively.

As the focusing position of the pickup system is shifted toward the center (0), a monitored image of the TV camera is gradually magnified. On the other hand, the monitored image is gradually reduced as the focusing position is shifted toward the TV camera. Therefore, a luminance distribution to be observed is changed in accordance with the distance (Z). As a result, true structural parameters such as eccentricity, clad and core diameters of an optical fiber are not accurately obtained.

Figure 8:
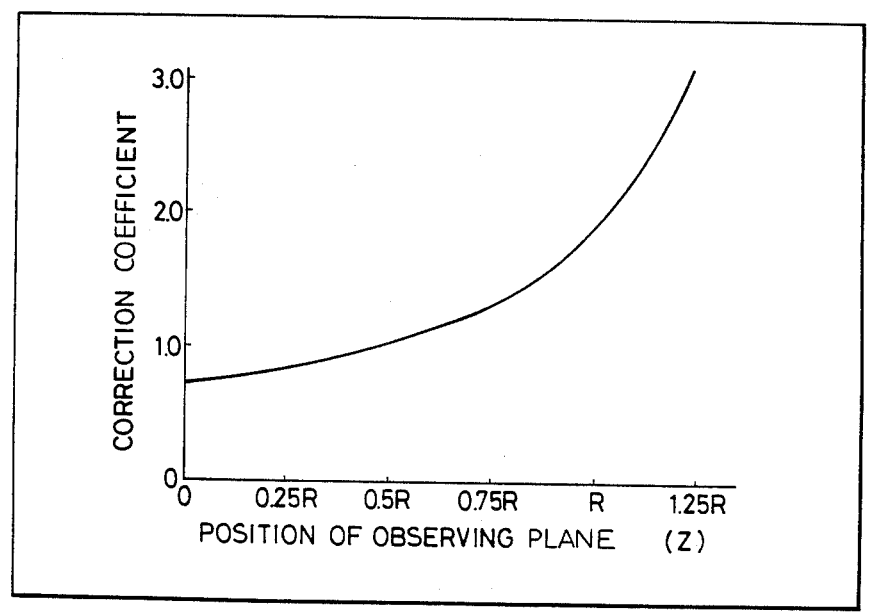
FIG. 8 shows the relationship of correction efficient for the lens effect with a distance between the center of an optical fiber and an observing plane.

FIG. 8 shows the relationship of a correction coefficient for the lens effect with distance (Z). Once the above relationship is obtained before the measurement of the structural parameters of the optical fiber, the correction of a luminance distribution on an observing plane located at an optional observing angle and an optional position can be performed with the relationship of the correction coefficient with the position of observing plane (Z).

Another method of correcting the lens effect is a correction on the basis of a bright-dark ratio (t) which is obtained by the following equation: $t = \overline{R_1R_2}/\overline{P_1P_2}$. For example, each luminance distribution of all observing planes to be observed is measured after each position of the observing planes is beforehand preadjusted so that the bright-dark ratios obtained for the observing planes are constantly equal to each other.

Figure 9:
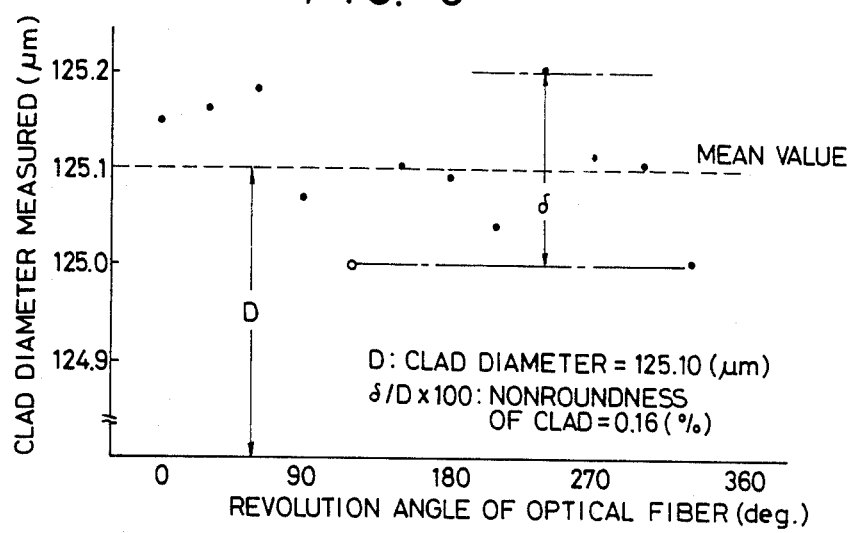
FIG. 9 shows a graph in which measured data of a clad diameter according to this invention are plotted.
Figure 10:
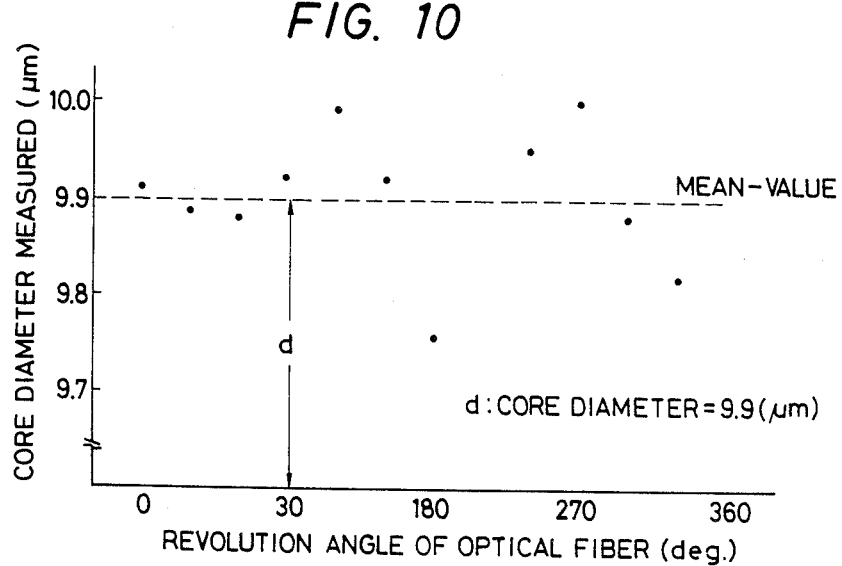
FIG. 10 shows a graph in which measured data of a core diameter according to this invention are plotted.
Figure 11:
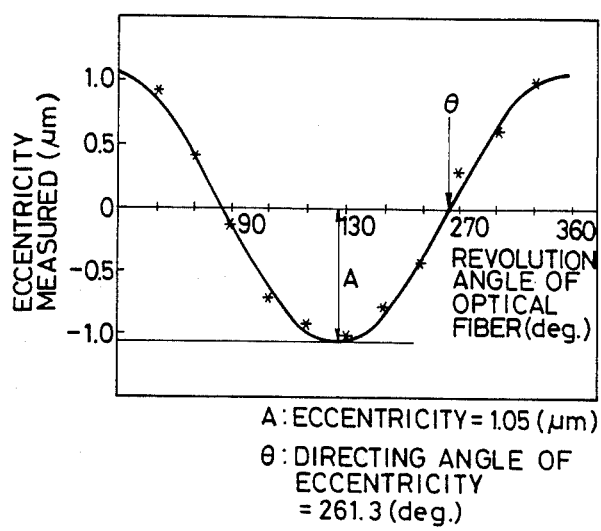
FIG. 11 shows a graph in which measured eccentricities of an optical fiber are plotted.

FIGS. 9 through 11 show the results of measurement of the clad and core diameters and the eccentricity of the single mode optical fiber using the measuring instrument of FIG. 3 when the optical fiber is rotated by 30 degrees each time. In this measurement, the term "eccentricity" means a distance between the centers of a clad and a core.

FIG. 9 shows the clad diameters measured. The mean value of the clad diameter measured at each observing angle becomes the clad diameter of the optical fiber being examined. Moreover, the difference ($\delta$) between the maximum and minimum values of the clad diameter at each observing angle is divided by the mean clad diameter to obtain the nonroundness of the clad $\delta/D \times 100$.

FIG. 10 shows the core diameters measured. The mean core diameter measured at each observing angle becomes the core diameter of the optical fiber being examined.

FIG. 11 shows the eccentricities measured, wherein the results obtained by fitting the sine wave function to the eccentricity measured at each observing angle are indicated by a continuous line. The amplitude A of the sine wave function becomes the eccentricity of the optical fiber, whereas the initial phase applies as a direction angle $\theta$ of the eccentricity of the optical fiber.

The following table shows the reproducibility of the measured values obtained from the measuring instrument of FIG. 3 in comparison with those obtained through the conventional process. The term reproducibility as used in this application means that dispersion of the measured values is considerably small. The reproducibility of the measured values is indicated with a standard deviation for 20 repetitions. As is obvious from the following table, for each of the items: clad and core diameters and core/clad eccentricity, and the nonroundness of the clad, this invention shows a smaller standard deviation of data measured in the repeating measurement and obtains reliable test results as compared with results obtained through the conventional process.

|  | this invention | prior art |
| --- | --- | --- |
| Clad diameter | 0.10 $\mu$m | 0.2 $\mu$m |
| Core diameter | 0.12 $\mu$m | 0.2 $\mu$m |
| Eccentricity | 0.08 $\mu$m | 0.16 $\mu$m |
| Nonroundness of clad | 0.06% | 0.08% |

The embodiments as described above relate to the cases where structural parameters are obtained by use of a light transmitted through an optical fiber. However, if a substantially parallel monochromatic light is used as an incident light on the optical fiber, diffraction fringes thereof appear in a monitored image. By use of the diffraction fringes, the outer diameter of the optical fiber and a position of an observing plane can be precisely measured. In this case, the monochromatic light not only makes the diffraction fringes, but also has an effect of making a monitored image of the optical fiber wider.

The following description is made on the measurement of the outer diameter of an optical fiber by use of the diffraction fringes as described above.

Figure 12:
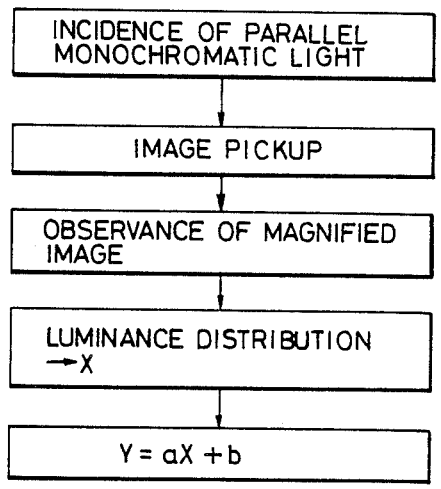
FIG. 12 is a flowchart showing the steps of measuring the outer diameter of an optical fiber.
Figure 13A:
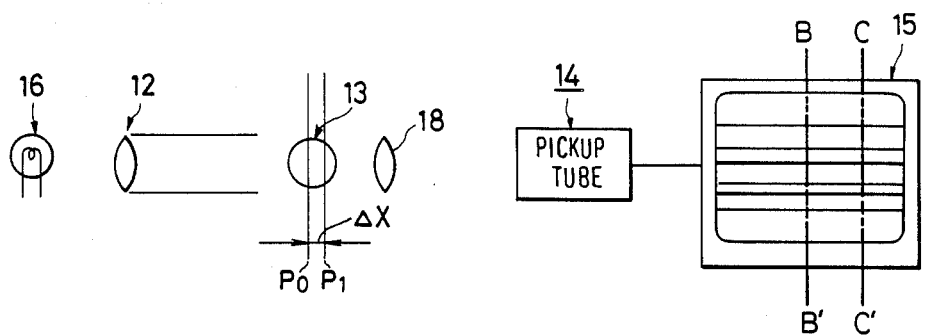
FIG. 13(A) is a block diagram of a measuring instrument for measuring the outer diameter of an optical fiber as an application of the method of the present invention.
Figure 13B:
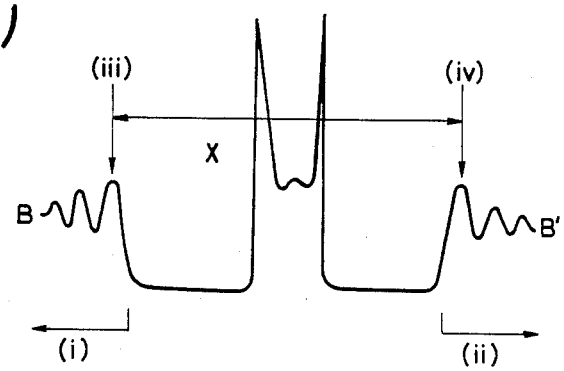
FIG. 13(B) is a luminance distribution on a line B-B' of the monitored image as shown in FIG. 13(A)

FIG. 12 is a flowchart showing the steps of measuring the outer diameter of an optical fiber. FIG. 13(A) is a block diagram of a measuring instrument for measuring the outer diameter of an optical fiber as an application of the present invention. FIG. 13(B) a luminance distribution on a line B-B' of a diffraction image and a transmittance image of a monochromatic light.

Referring to FIG. 13(B), a description will be given of a measuring instrument for measuring the outer diameter of an optical fiber as an application of the present invention.

Like reference characters are given to like elements and the description thereof will be omitted.

A light source 16 for emitting monochromatic light is arranged in the direction perpendicular to the optical axis of an optical fiber 13 being examined so that the light is directed to the sidewall of the optical fiber 13.

A LED highly monochromatic properties can be used as the light source 16 and as for a lens 12, a collimator lens is installed between the light source 16 and the optical fiber 13 in order to collimate the monochromatic light from the light source 16. Accordingly, the light source 16 is disposed at the focal point of the lens 12. A pickup tube 14 is installed in a position facing the side shaded by the optical fiber 13 with an objective lens 18 therebetween and a magnified diffraction image of the optical fiber 13 is projected thereto. The pickup tube 14 is connected to a monitor TV 15, which displays the magnified diffraction image. The plane being observed and displayed is disposed so as to be in between a plane Po crossing the center of the optical fiber 13 and the objective lens 18. The light source 16, the lens 12 and the pickup tube 14 are disposed on the same straightly line, whereas the optical axis of the optical fiber 13 is set perpendicular thereto.

The process of examining an optical fiber will subsequently be described on reference to FIGS. 12 through 13.

At the first step shown in FIG. 12, the monochromatic light emitted from the light source 16 is collimated by the lens 12 and irradiated to the sidewall of the optical fiber 13. Accordingly, the optical axis of the collimated monochromatic light perpendicularly crosses that of the optical fiber 13.

At the second step, the image on the face $P_1$ being observed Of the optical fiber 13 resulting from the irradiation of the collimated monochromatic light is magnified by, e.g., the objective lens 18 and projected on the pickup tube 14. Since the monitor TV 15 has been connected to the pickup tube 14, the image of the optical fiber thus magnified at the third step is observed by the monitor TV 15. The magnification of the image is performed by the objective lens 18 of the pickup tube 14 and, depending on the size of the optical fiber being observed, a proper magnification is selected.

At the subsequent fourth step, the luminance distribution along the line B-B' of the image of the optical fiber 13 displayed on the monitor TV 15 is obtained. Provided an arrangement is made as in the case of this embodiment, the distribution looks as shown in FIG. 13(B).

The important point is that, because the monochromatic light having high collimation with a narrow spectrum width is employed, diffraction fringes shown by (i), (ii) appear in a portion corresponding to the outer edge of the optical fiber. Based on the luminance distribution, the distance X between the first peaks (iii), (iv) is obtained. The relation of the X to the outer diameter Y of the optical fiber is linear and expressed by the following equation of the first degree:

$$Y = aX + b \text{ (where a, b are constants)} \quad (1)$$

In this case, a, b represent quantities dependent on the magnification of the observing system and the vertical distance $\Delta X$ between the planes, namely, Po crossing the center of the optical fiber 13 and $P_1$ being observed. The outer diameter Y of the optical fiber 13 can thus be obtained from the distance X between the diffraction fringes at the fifth step by obtaining the a, b beforehand while the $\Delta X$ is set constant when the measurement is taken.

Figure 14:
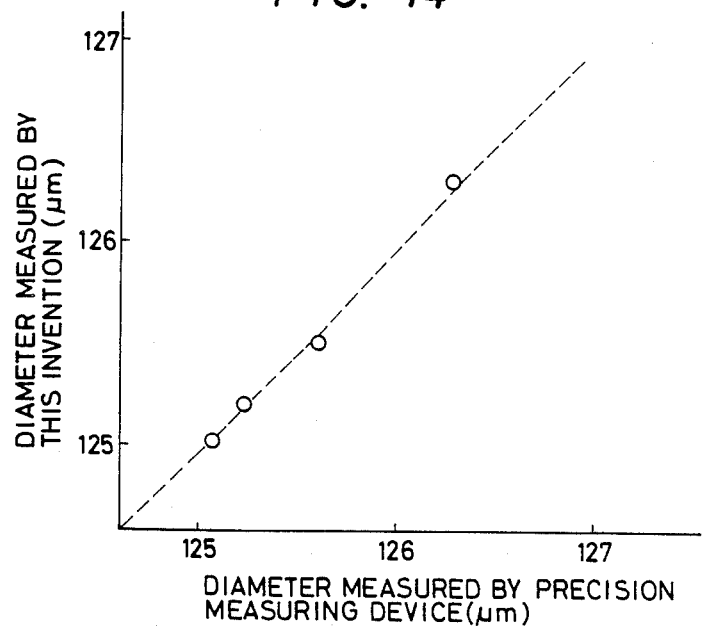
FIG. 14 is a graph showing a comparison between the values measured under the process of measuring the outer diameter of an optical fiber and those measured using a contact type precision measuring instrument.

FIG. 14 shows a comparison between the values measured under the process of measuring the outer diameter of an optical fiber and those measured using a contact type precision measuring instrument.

In this experiment, several kinds of quartz fibers about 125 μm in outer diameter were used as test samples, with an LED having a wavelength of 0.73 μm and an output of 10 μm as a light source and a pickup tube having an object lens of 60 magnifications as a detector. As X, Y values, the mean value of twelve data resulting from the measurement of the optical fibers every 30° is used.

As is obvious from FIG. 14, there is the liner relation between both X, Y, i.e., the values measured in accordance with the process embodying the present invention coincides with those measured by the precision measuring instrument to a considerable extent.

Since the calibration of the pickup tube has been made using a microscale, a=1, b=0 in the equation (1) and the reproducibility (standard deviation at N=10) of the measured outer diameter of the same optical fiber became 0.01 μm in the process according to the present invention.

Accordingly, the outer diameter of the optical fiber can be measured by the above method with accuracy and reliability.

Furthermore, by shifting the position where the luminance distribution on the monitor TV from a line B-B' to C-C' or the optical fiber in the direction of to its optical axis, the outer diameter of the outer portion thereof can readily be made.

The following description is made on the precise measurement of a position of an observing plane by use of the diffraction fringes.

Figure 15:
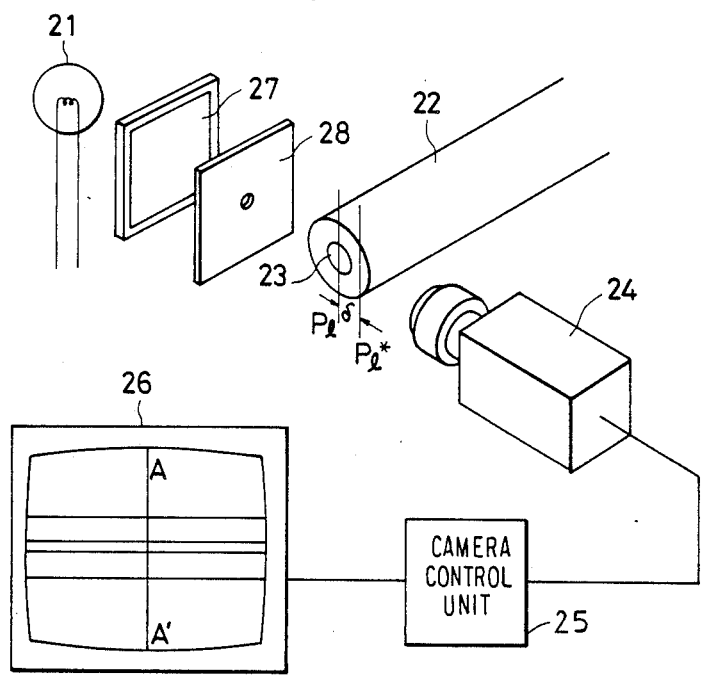
FIG. 15 is a schematic block diagram of a position detecting apparatus embodying the method of this invention.

FIG. 15 is a schematic block diagram of a position detecting apparatus embodying the present invention. The apparatus shown in FIG. 15 is equipped with a light source 21 and, as the light source, a white light source such as a halogen lamp or light-emitting diode (LED) capable of emitting light of high luminance. The light emitted from the light source 21 is incident on a band-pass filter 27 for allowing light of a particular wavelength to pass therethrough. The light passed through the band-pass filter 27 is passed through the small hole provided in a pinhole plate 28 and illuminates the edge side of an optical fiber 22. The side image of the optical fiber 22 is picked up by a television camera 24, which is arranged so that the optical axis connecting the light source 21 and the camera 24 is set perpendicular to the plan including the central axis of the optical fiber 22. The output of the television camera 24 is connected to the input of a camera control unit 25. The output of the camera control unit 25 is connected to the input of a monitor television 26.

The light emitted from the white light source 21 such as a halogen lamp is passed through the band-pass filter 27 and then the small hole of the pinhole plate 8 to be converted into a point irradiating light relatively equivalent to monochromatic light. When a light-emitting diode is used as a light source, it is unnecessary to provide the band-pass filter 27 and the pinhole plate 28 having the small hole. While the point irradiating light is employed to illuminate the side wall of the optical fiber 22 at an end thereof, the television camera 24 is employed to pick up the side image of the optical fiber 22. The image thus picked up is displayed via the camera control unit 25 on the monitor television 26. The optical fiber is held by the holding means (not shown) in such a manner that its center axis is set perpendicular to the luminance measuring line A—A' on the television monitor 26.

Figure 16:
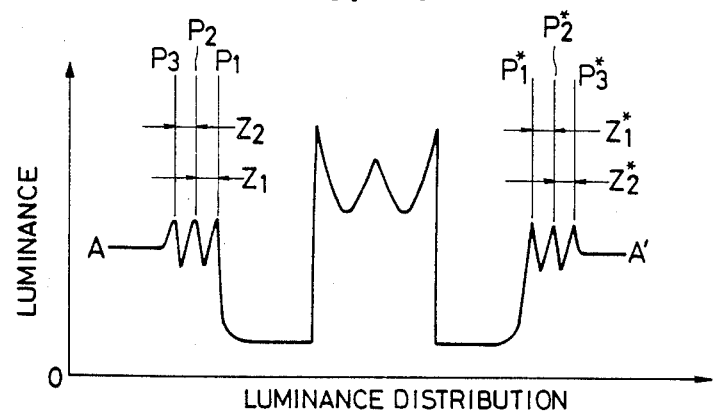
FIG. 16 shows a luminance distribution of the image as shown in FIG. 15.

Based on the present invention, an optical fiber having 125 μm of the outer diameter thereof was caused to receive light from a light emitting diode set 30 cm apart therefrom in order to observe the side image of the optical fiber by a TV camera equipped with an object lens of 60 magnifications. FIG. 16 shows a luminance distribution of the image as shown in FIG. 15. In the luminance distribution of FIG. 16, the vertical axis represents the luminance, while the horizontal axis shows the position along the luminance measuring line A—A′, wherein the origin corresponds to the upper end of the luminance measuring line A—A′.

Given that the peak positions of diffraction fringes are designated by $P_1, P_2, P_3 \ldots, P_n$ and $P_1^*, P_2^*, P_3^*, \ldots, P_n^*$, the distances between $P_1$ and $P_2$, $P_2$ and $P_3, \ldots, P_{n-1}$ and $P_n$ are respectively designated by $Z_1, Z_2, \ldots, Z_{n-1}$, and further the distances between $P_1^*$ and $P_2^*$, $P_2^*$ and $P_3^*, \ldots, P_{n-1}^*$ and $P_n^*$ are respectively designated by $Z_1^*, Z_2^*, \ldots, Z_{n-1}^*$. $Z_1, Z_2, \ldots, Z_{n-1}$ and $Z_1^*, Z_2^*, \ldots, Z_{n-1}^*$ are dependent of the distance between the position $P_i^*$ of the observing plane and the center position $P_I$ of the cylindrical object being examined. Accordingly, if the relation between each position of $Z_1, Z_2, \ldots, Z_{n-1}$ and $Z_1^*, Z_2^*, \ldots, Z_{n-1}$ to the distance $\delta$ is predeterminedly obtained, the distance $\delta$ can be calculated from the measured $Z_1, Z_2, \ldots, Z_{n-1}$ and $Z_1^*, Z_2^*, \ldots, Z_{n-1}^*$, that is the position of the plane being observed becomes precisely detectable.

Figure 17:
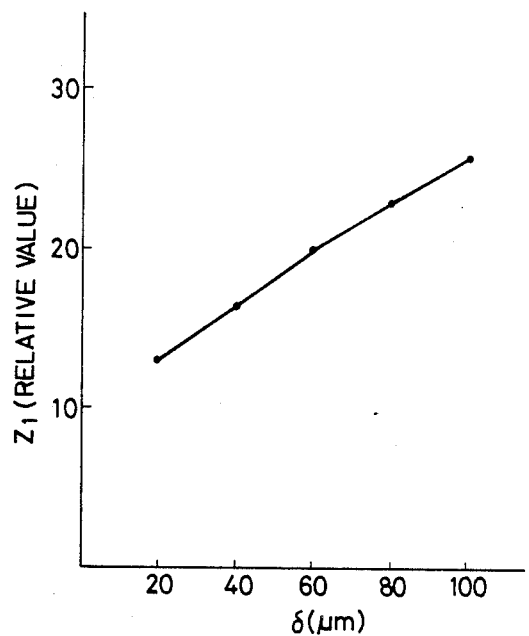
FIG. 17 shows a relationship of a distance between $P_1$ and $P_2$ as shown in FIG. 16 to the distance between the position of the observing plane and the center position of an optical fiber.

The relation of $Z_1$ (distance between $P_1, P_2$) where diffraction fringes are clearly observed to the distance $\delta$ was measured and shown in FIG. 17. As shown in FIG. 17, the relation between $Z_1$ and the distance $\delta$ is linear and it was proved that the value, i.e., the position of the plane being observed is detectable from the measured value of $Z_1$ accurately.

In this embodiment, the optical fiber mounted on a precision stage was moved in the direction of the optical axis connecting the light source and the television camera and the distance $\delta$ was measured by reading the amount of the movement from a linear scale with 0.1 μm reading.

The above embodiment measures precisely a position of an observing plane by use of the diffraction fringes of the collimated monochromatic light from the light source. However, this invention can adopt a collimated monochromatic light, but also a light of a naked light bulb or a diffused light.

In a case where the light of a naked light bulb or the diffused light is employed, a monitored image corresponding to the outer edge of an optical fiber becomes sharpest when an observing plane is located at the center of an optical fiber. The observing plane is predeterminedly located at the position where the monitored image is sharpest, and is shifted from the position by use of a precise length measuring apparatus thereby to determine the position of the observing plane. If the methods of determining the position of an observing plane according to the invention are applied to an optical fiber fusion welding machine, they produce more effect on the optical fiber fusion welding machine.

Figure 18:
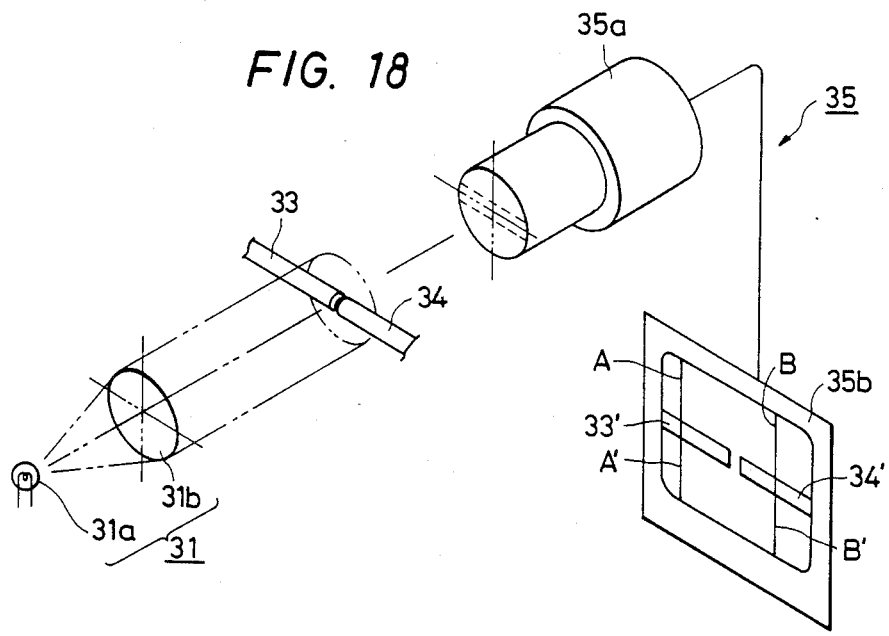
FIG. 18 is a block diagram of an optical fusion welding machine according to this invention.

FIG. 18 is a block diagram of the optical fusion welding machine. In FIG. 18, a lens 31b for collimating the flux of light emitted from a light source 31a is arranged in the rear of the light source 31a. The lens 31b may vary in shape with the shape of the light source 31a and the distance across the light source 31a. In the case of a convex lens, for instance, a point source of light may be installed at the focal point in front of the lens. However, such a lens can be omitted when the light source is considered a plane source of light, instead of the point source of light in view of the size of the object being illuminated. What is important is that the flux of light is collimated between the objects 33, 34 being examined. The light thus collimated from the lens 31b is irradiated to the connections of optical fibers 33, 34 as objects being examined and then the luminance distribution thereof is detected by an image analyzer 35 installed in the rear of the objects 33, 34 being examined. The images of the objects are taken by an image observing elements 35a via an objective lens and observed by a monitor TV 35b. The luminance distribution between A-A′ of the image 33′ of the object 33 and that between B-B′ of the image 34′ of the object 34 on the monitor TV 35b are compared by a CPU through a controller, so that the relative position of the object 33 to the object 34 is recognized. Normally, the axis of either object is adjusted to make the axes of both objects coincide with each other. Particularly when optical fibers are connected, the aforesaid operation is of use to mate the core centers of both optical fibers. In this case, importance should be attached to the scanning direction of the luminance distribution (A-A′, B-B′) and the scanning of the luminance distribution is made in the direction perpendicular to the collimated light and the axis of the object.

When an optical fiber is observed from the sidewall thereof, the lens effect on the surface of the optical fiber generally makes different the "apparent" eccentricity ("apparent" eccentric distance between the center of the core and that of the outer diameter of the optical fiber) from the true one. In order to obtain the true eccentricity based on the calculation derived from the measured "apparent" eccentricity, that is, to determine the true center core position, a correction coefficient, which is dependent on the position of the observing plane of the image on the sidewall of the optical fiber, must be obtained beforehand. In other words, in order to determine true eccentricity, that is, to precisely connect optical fibers, it is prerequisite to accurately determine the position of the observing plane.

Accordingly, by utilizing the methods of determining the position of an observing plane as described above, axis mating accuracy in the process of connecting optical fibers can be improved with the shortened time required for mating axes. Moreover, the improved axis mating accuracy decreases optical fiber connection loss but increases reliability of light communication.

In the above-described embodiments, an observing light from a light source is directly or through a collimating lens applied to the sidewall of an optical fiber. However, a cylindrical lens may be disposed between the light source and the optical fiber in order to increase quantity of light to be detected, improve signal-to-noise ratio and increase a detecting rate.

Figure 19:
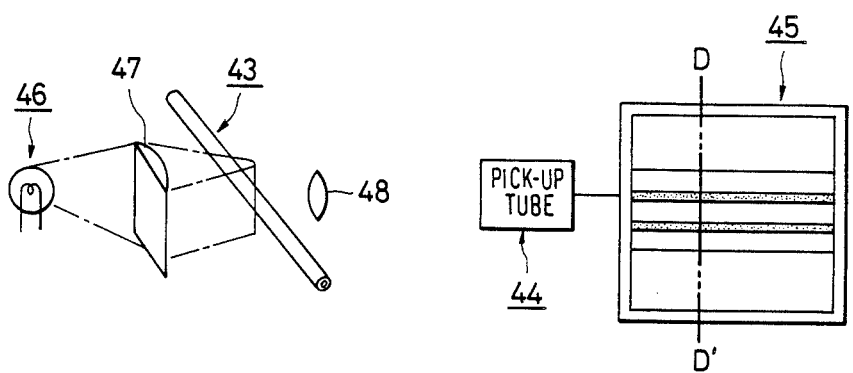
FIG. 19 shows a measuring instrument employing a cylindrical lens according to this invention.

FIG. 19 shows a measuring instrument employing a cylindrical lens, for example, to which the process of measuring the outer diameter of an optical fiber is applied. The cylindrical lens is used for converging the light in a fixed direction so that the scanning of luminance distribution in the image displayed on the monitor TV 45 may not be obstructed. For the purpose of measuring the outer diameter of the optical fiber 43 in that case, because the scanning direction is limited to what is perpendicular to the optical axis of the optical fiber, the cylindrical lens 47 is installed in such a manner as to converge the light in the optical axis of the optical fiber. That is, as shown in FIG. 19, a long axis (longitudinal direction) where the curvature radius of the cylindrical lens is made infinite is set perpendicular to the optical axis of the optical fiber. Element 48 is an objective lens.

Under the measuring process, high luminance data is made obtainable without increasing the output of the monochromatic light source 46 and consequently the accuracy of the outer diameter measured can be improved with reliability.

Figure 20:
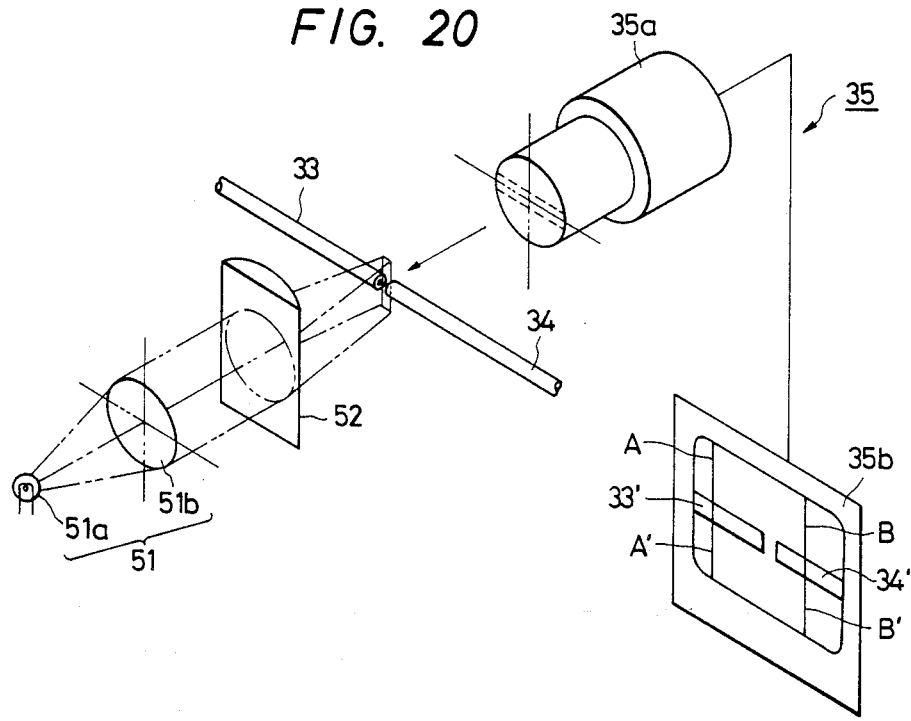
FIG. 20 shows another measuring instrument in which a cylindrical lens according to this invention is applied to the optical fusion welding machine as shown in FIG. 18.

FIG. 20 shows another measuring instrument in which a cylindrical lens is applied to the optical fusion welding machine as shown in FIG. 18.

As the cylindrical lens 52 is so arranged that its long axis direction is set perpendicular to a collimated light (from source 51a and collimating lens 51b) and the axial direction of an object being examined, the collimated light is converged in the axial direction. This embodiment of the present invention is not limited to the use of the cylindrical lens as exemplified, provided what is capable of converging light in the aforesaid direction.

The eccentricity of the core of the single mode fiber 125 μm in outer diameter was measured using a conventional luminance distribution detecting method and the one of the present invention. The reproducibility of the eccentricity measured and the time required for obtaining data were compared in the form of test data shown in the following table

|  | reproducibility of eccentricity measured $\sigma_{n-1}(\mu m)\ N = 5$ | time required for obtaining data |
| --- | --- | --- |
| prior art | 0.024 | 1 |
| this invention | 0.025 | 0.1 |

As the light source, an LED having a wavelength of 0.73 μm was used and optical fibers being examined were located at the focal point of a cylindrical lens. As is apparent from the above table, the luminance distribution detecting apparatus as shown in FIG. 20, as compared with the one as shown in FIG. 18 using only a collimated light source, proved that the time required for obtaining the data was 1/10 shortened without reduction in measurement accuracy.

As set forth above, according to the present embodiment, since illumination on the object having an axis can be converged with great luminance in the direction in which the scanning of luminance distribution is not obstructed, the structural parameters of each edge portion become detectable with accuracy in mating the axes of the objects having axes, particularly optical fibers. The cylindrical lens also has the same effect on a measuring apparatus adopting other ordinary light, for example a white light, than a collimated monochromatic light.

In the above embodiments, a TV camera is employed in an image pickup system and an image (luminance distribution) monitored by it is utilized for determining structural parameters of an optical fiber. However, this invention is not limited thereto. A CCD line sensor may be used in place of the TV camera. In order to make a resolution of the image pickup system higher and to average measured data which are obtained in the longitudinal direction of the optical fiber, the CCD line-sensor may be mechanically scanned in the direction perpendicular to the axis of the sensor.

Further plural CCD line-sensors are disposed in the longitudinal direction of an optical fiber to simultaneously measure luminance distributions on the respective line-sensors, calculate respective eccentricities obtained by the respective line-sensors, and obtain an average value thereof, whereby an average eccentricity at an observing angle concerned is determined.

Figure 21:
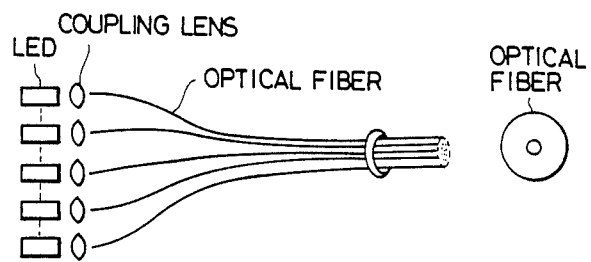
FIG. 21 is a schematic diagram of a fiber bundle comprising plural LEDs and plural optical fibers optically connected to the LEDs.

In the above embodiments, a bundle fiber comprising plural LEDs and plural optical fibers optically connected to the LEDs as shown in FIG. 21 may be used as a light source to make a luminance of observing light stronger and increase degree of freedom of the position of the light source. Further, to keep the measurement environment clean and avoid any adverse influence of dust or the like, clean air may be sent to at least a space where a light source, an optical fiber to be examined and an objective lens are disposed.

As described above, in the method of apparatus for measuring the outer diameter and the structure of an optical fiber according to the present invention, the optical fiber being examined need not be cut because it is observed from its sidewall and the state of the cross section thereof does not affect the measured values. Accordingly, the structure of the optical fiber can easily be examined accurately without being damaged.

Moreover, since the optical fiber or the optical axis of the pickup system is rotated for measuring purposes, the clad and core diameters and the eccentricity in the circumferential direction can be known and, by processing the data, the true clad and core diameters, the eccentricity and the nonroundness of the clad can also be measured with accuracy. The process of fitting the sine wave function with respect to the eccentricity makes it possible to extract only the true eccentric components from the eccentricity measured at each angle of rotation, so that the optical fiber is hardly subject to electric or mechanical measurement errors.

Figure 22A:
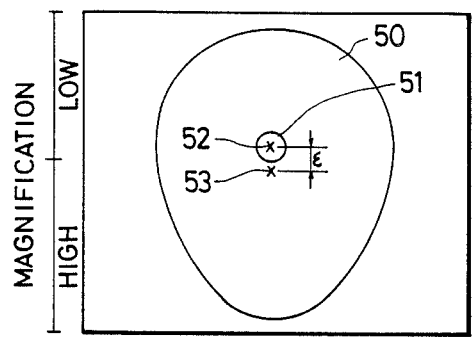
FIG. 22(A) through 22(C) are diagrams illustrating the effect of distortion of the magnifying power of a pickup system when an optical fiber free from eccentricity is examined.
Figure 22B:
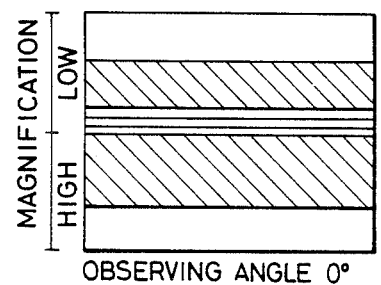
Figure 22C:
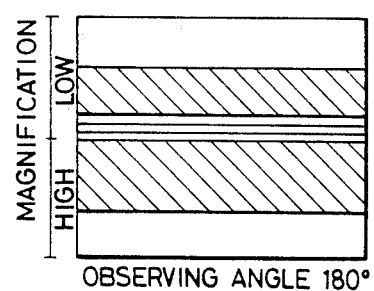

When the magnifying power of the pickup system differs in the vertical direction, for instance, the eccentricity measured is affected by the distortion of the magnifying power in the conventional examining method as shown in FIG. 22A and consequently a quantity corresponding to the aforesaid distortion is measured as an eccentricity for an optical fiber being examined but free from eccentricity. FIG. 22A illustrates a clad 50, a core 51, the center 52 common to a true core, a true clad and the core being measured, and the center 53 of the clad being measured. In the process of examining the structure of the optical fiber according to the present invention, the eccentricity of the optical fiber is obtained from changes in the eccentricity measured in the circumferential direction of the optical fiber and hardly affected by the aforesaid distortion. In FIGS. 22B, 22C, there is shown the effect of the distortion of the magnifying power of the pickup system at measuring angles of 0° and 180° as an example of examining an optical fiber free from eccentricity. In the examining process of the present invention, the eccentricity of the optical fiber being examined is judged zero because the eccentricity measured will not change even if the observing angle is examined, the presence of the distortion of the magnifying power of the pickup system will not affect the change of the eccentricity in the circumferential direction of the optical fiber and, when the sine wave function is fitted, its amplitude becomes zero. In consequence, the eccentricity of the optical fiber being examined is measured as zero.

Figure 23:
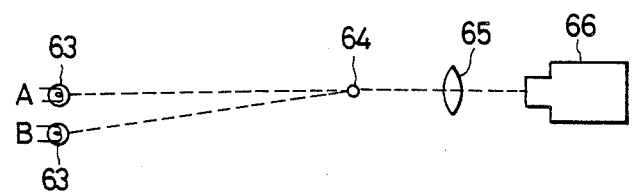
FIG. 23 is a diagram illustrating the positional shifting of a light source.
Figure 24:
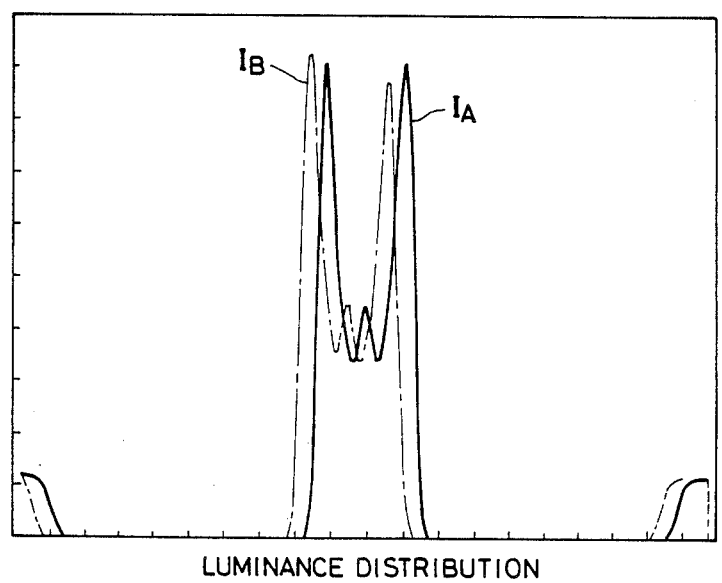
FIG. 24 is a diagram illustrating changes in distribution patterns of illumination due to the positional shifting of the light source of FIG. 23.

When the optical axis connecting the light source and the pickup system is not perpendicular to the axis of the optical fiber, e.g., when the position of the light source 63 changes from A to B as shown in FIG. 23, a pattern of the luminance distribution observed by a television camera 66 via an optical fiber 64 being examined and an objective lens 65 changes as shown in FIG. 24. In the luminance distribution with the light source 63 of FIG. 23 without being shifted in the position A and a luminance distribution with the light source 63 shifted in the position B, respectively. The structural parameters obtainable from the luminance distribution include the influence of the shifted position of the light source. In the instrument for examining the structure of the optical fiber according to the method of the invention, the parameters are not affected by the shift of the light source because the optical axis connecting the light source and the pickup system is set perpendicular to the axis of the optical fiber.

Still furthermore, the position detecting method and apparatus according to the present invention can accurately detect the position of the observing plane of the optical fiber to be examined by measuring the distance between the diffraction fringes produced at the outer edge of the optical fiber using the point source for emitting substantially monochromatic light. Consequently, the center position of the core is measured accurately by observing the side image of the optical fiber. The position detecting method according to the present invention thus has a wide range of uses, e.g. for optical fiber fusion welding machines.

What is claimed is:

1. An apparatus for examining the structure of an optical fiber having a core and a cladding surrounding said core, said core and said cladding having different refractive indices, said apparatus comprising:
   optical measuring means comprising a light source for irradiating a side wall of said optical fiber with an observing light beam and a pickup system for detecting that part of said observing light beam which traverses said optical fiber;
   means for mounting said optical fiber, one of said optical fiber mounting means and said optical measuring means being rotatable relatively to the other such that an axis of said optical fiber and the optical axis of said optical measuring means are set perpendicular to each other; and
   means coupled to said pickup system for correcting a luminance distribution as detected by said pickup system for a lens effect due to the different refractive indices of said core and said cladding of the optical fiber under observation.

2. An apparatus as claimed in claim 1, wherein said pickup system comprises a television camera for monitoring an image of said traversed light beam and an image processing unit for analyzing a luminance distribution of said image.

3. An apparatus as claimed in claim 1, wherein said optical measuring means further comprises light collimating means disposed in between said light source and said optical fiber for collimating said observing light beam from said light source.

4. An apparatus as claimed in claim 1, wherein said observing light beam comprises substantially monochromatic light.

5. An apparatus as claimed in claim 1, wherein said observing light beam comprises diffused light.

6. An apparatus as claimed in claim 1, wherein said optical measuring means further comprises a cylindrical lens for converging said observing light beam in the direction of the axis of said optical fiber.

7. An apparatus as claimed in claim 1, wherein said image pickup system comprises charge coupled device(CCD) line-sensors, said CCD line-sensors being mechanically scanned in a direction perpendicular to the axis thereof.

8. An apparatus as claimed in claim 1, wherein said light source comprises a fiber bundle having plural light emitting diodes(LED) and plural optical fibers optically connected to said LEDs.

9. An apparatus as claimed in claim 3, wherein said light collimating means comprises a collimator lens.

10. An apparatus as claimed in claim 4, wherein said light source comprises a light emitting diode(LED).

11. The apparatus as claimed in claim 1, wherein said means for correcting includes means for determining a relative position of said optical fiber and said pickup system with respect to the optical axis, and performs correction of the luminance distribution based on the relative position.

12. A method of examining the structure of an optical fiber having a core and a cladding surrounding said core, said core and said cladding having different refractive indices, said method comprising the steps of:
   arranging optical measuring means comprising a light source for generating light and a pickup system for detecting said light in such a manner that an axis of said optical fiber and an optical axis of said optical measuring means are perpendicular to each other;
   irradiating a side wall of said optical fiber with said light in the direction perpendicular to said axis of said optical fiber;
   measuring a luminance distribution of light traversing said optical fiber;
   correcting a lens effect due to the different refractive indices of said core and said cladding on said luminance distribution of said light on the basis of the position of an observing plane; and
   calculating optical fiber structural parameters including at least one of eccentricity, cladding diameter, core diameter and nonroundness of said cladding, on the basis of said luminance distribution as subjected to correction for the lens effect.

13. A method as claimed in claim 12, further comprising the steps of:
   rotating one of said optical fiber and said optical detecting means relatively to the other while said fiber axis and said optical axis remain set perpendicular to each other;
   measuring luminance distributions subjected to said correction for the lens effect at plural observation angles; and
   calculating said at least one optical fiber structural parameter at said observation angles.

14. A method of measuring the outer diameter of and the position of an observing plane of an optical fiber, said method comprising the steps of:
   arranging optical detecting means, comprising a monochromatic light source for generating substantially monochromatic light, light collimating means for collimating said monochromatic light and a pickup system for detecting said monochromatic light, in such a manner that an axis of said optical fiber and an optical axis of said optical measuring means are perpendicular to each other;
   collimating said monochromatic light;
   irradiating the side wall of said optical fiber with said collimated monochromatic light in the direction perpendicular to said axis of said optical fiber;
   detecting a luminance distribution of collimated monochromatic light traversing said optical fiber, said luminance distribution including diffraction fringes appearing at a location in correspondence and proximate to the outer edge of said optical fiber; and calculating the distance between said diffraction fringes to determine the outer diameter of said optical fiber and the position of said observing plane of said optical fiber.

15. A method as claimed in any one of claims 12 and 14, said method further comprising the steps of:
converging said light from said light source in the direction of said axis of said optical fiber before irradiating said optical fiber with said light.

16. A method as claimed in any one of claims 12 and 14, where said pickup system comprises CCD line sensors, said line sensors being mechanically scanned in the direction of an axis of said CCD line sensors.

* * * * *